US012315379B2

(12) United States Patent
Sacle et al.

(10) Patent No.: US 12,315,379 B2
(45) Date of Patent: May 27, 2025

(54) AUTOMATIC SELECTION OF AN AIRCRAFT FLIGHT PLAN IN THE APPROACH PHASE

(71) Applicant: THALES, Courbevoie (FR)

(72) Inventors: Jérôme Sacle, Toulouse (FR); Marion Chaillou, Toulouse (FR); Christophe Caillaud, Toulouse (FR); Fabien Chovin, Toulouse (FR); Michel Roger, Toulouse (FR)

(73) Assignee: THALES, Courbevoie (FR)

( * ) Notice: Subject to any disclaimer, the term of this patent is extended or adjusted under 35 U.S.C. 154(b) by 117 days.

(21) Appl. No.: 18/013,723

(22) PCT Filed: Jun. 28, 2021

(86) PCT No.: PCT/EP2021/067643

§ 371 (c)(1),
(2) Date: Dec. 29, 2022

(87) PCT Pub. No.: WO2022/012907

PCT Pub. Date: Jan. 20, 2022

(65) Prior Publication Data

US 2024/0038075 A1 Feb. 1, 2024

(30) Foreign Application Priority Data

Jul. 17, 2020 (FR) ....................................... 2007500

(51) Int. Cl.

| | |
|---|---|
| ***G08G 5/34*** | (2025.01) |
| ***G08G 5/21*** | (2025.01) |
| ***G08G 5/54*** | (2025.01) |

(52) U.S. Cl.

CPC ................. *G08G 5/34* (2025.01); *G08G 5/21* (2025.01); *G08G 5/54* (2025.01)

(58) Field of Classification Search

CPC ..... G08G 5/0039; G08G 5/0021; G08G 5/025
See application file for complete search history.

(56) References Cited

U.S. PATENT DOCUMENTS

2007/0129855 A1* 6/2007 Coulmeau ............ G08G 5/0056 701/3
2007/0129857 A1* 6/2007 Fortier ..................... G08G 5/54 701/16

(Continued)

FOREIGN PATENT DOCUMENTS

FR 2 893 443 A1 5/2007
FR 2 894 368 A1 6/2007
FR 3 007 854 A1 1/2015

*Primary Examiner* — Abdalla A Khaled
(74) *Attorney, Agent, or Firm* — BakerHostetler

(57) ABSTRACT

In the field of air navigation, a computer-implemented method includes loading an initial active flight plan for an aircraft comprising a first approach procedure to a runway up to a missed approach point ending between the missed approach point and a final point; loading a secondary flight plan comprising an approach procedure to the runway between the missed approach point and the runway, and a second missed approach procedure at the end of the approach, and ending at a second final point; receiving an instruction from an operator of the aircraft to link the initial active flight plan and the secondary flight plan; in the event of a go-around by the operator at the latest at the missed approach point, activating the missed approach procedure; otherwise, automatically selecting the secondary flight plan as active flight plan and activating the second approach.

11 Claims, 5 Drawing Sheets

(56) References Cited

U.S. PATENT DOCUMENTS

| | | | | |
|---|---|---|---|---|
| 2008/0154486 | A1* | 6/2008 | Coulmeau | G08G 5/34 701/120 |
| 2009/0030564 | A1* | 1/2009 | Peterson | G08G 5/723 701/16 |
| 2011/0184595 | A1* | 7/2011 | Albert | G05D 1/0676 701/16 |
| 2014/0309817 | A1* | 10/2014 | Burgin | G08G 5/0091 701/3 |
| 2015/0005992 | A1* | 1/2015 | Coulmeau | G05D 1/0676 701/16 |
| 2017/0263137 | A1* | 9/2017 | Nostry | G08G 5/21 |
| 2019/0279516 | A1* | 9/2019 | Pr | G08G 5/21 |
| 2020/0273356 | A1* | 8/2020 | Raynaud | G08G 5/26 |
| 2021/0034053 | A1* | 2/2021 | Nikolic | G08G 5/22 |
| 2021/0221530 | A1* | 7/2021 | Venkataramana | B64D 45/0056 |
| 2022/0057814 | A1* | 2/2022 | Wang | G05D 1/0005 |
| 2022/0129016 | A1* | 4/2022 | Singh | G05D 1/0676 |
| 2023/0063241 | A1* | 3/2023 | Chippa | G08G 5/54 |
| 2023/0076554 | A1* | 3/2023 | Shyman | G08G 5/22 |

* cited by examiner

AUTOMATIC SELECTION OF AN AIRCRAFT FLIGHT PLAN IN THE APPROACH PHASE

CROSS-REFERENCE TO RELATED APPLICATIONS

This application is a National Stage of International patent application PCT/EP2021/067643, filed on Jun. 28, 2021, which claims priority to foreign French patent application No. FR 2007500, filed on Jul. 17, 2020, the disclosures of which are incorporated by reference in their entirety.

FIELD OF THE INVENTION

The present invention relates to the field of air navigation, and more particularly to the field of navigation along flight plan procedures.

BACKGROUND

Flight management systems (FMS) nowadays allow operators to select procedures by inserting them into flight plans. These procedures may for example consist of the approach to a runway with its associated go-around procedure.

In modern FMSs, procedures are selected manually by the operator (for example, the aircraft pilot, or a remote drone operator), and then followed by the FMSs. An operator is thus able, during the flight, to select a new procedure that will be followed by the FMS. However, this manual selection of new procedures may increase the workload of the operator, and thus be a source of unsafeness for the aircraft. This is particularly true in the approach phase, which is both the phase when the need for a change of procedure is most common, for example in the event of a runway change imposed by air traffic control or in the event of a go-around, and the phase in which the operator is the most stressed.

Thus, in the approach phase, an operator may have to select a second procedure following the initial approach and extend guidance from one to the other, in parallel with communications with the air traffic controller, while at the same time ensuring that the aircraft remains safe in a complex environment (close to the ground, often dense traffic near airports, possibility of hazardous terrain for airports in mountainous areas, etc.).

There is therefore a need for a method that makes it possible to automate, with a view to the approach phase, the activation of a second procedure that makes it possible to safeguard the trajectory of the aircraft in order to complete the landing successfully.

SUMMARY OF THE INVENTION

To this end, one subject of the invention is a computer-implemented method comprising: loading an initial active flight plan for an aircraft comprising a first approach procedure to a runway up to a missed approach point, and a missed approach procedure between said missed approach point and a final point; loading a secondary flight plan comprising a second approach procedure—to the runway between the missed approach point and the runway, said second approach procedure following the first approach procedure, and a second missed approach procedure at the end of said second approach procedure, and ending at a second final point; receiving an instruction from an operator of the aircraft to link the initial active flight plan and the secondary flight plan, said link consisting of an association between the active flight plan and the secondary flight plan, allowing automatic selection of one or the other; in the event of a go-around by the operator at the latest at said missed approach point, activating said missed approach procedure; otherwise, automatically selecting the secondary flight plan as active flight plan.

Advantageously, the method comprises, in the event of a go-around during a predetermined period after passing the missed approach point, automatically selecting the initial flight plan as current flight plan, and activating said missed approach procedure.

Advantageously, the guidance instruction active at the time of the automatic selection of the secondary flight plan as active flight plan is maintained during said predetermined period.

Advantageously, the roll rate of the aircraft is limited to a predefined roll rate during said predetermined period.

Advantageously, the method comprises, when the secondary flight plan is selected as active flight plan, inserting a DF segment to the first waypoint of the second approach procedure.

Advantageously, the method comprises, in the event of a go-around after said predetermined period after passing the missed approach point, activating the second missed approach procedure.

Advantageously, said second final point and said final point are collocated.

Advantageously, the secondary flight plan is established manually by the aircraft operator during a flight phase.

Advantageously, the aircraft operator sends, to the flight management system of the aircraft, a request to automatically obtain a secondary flight plan, and: the flight management system generates a plurality of candidate secondary flight plans: starting at the missed approach point; and passing through the runway; and ending at said second final point; the operator selects the secondary flight plan from among said candidate secondary flight plans.

Advantageously, the method comprises the flight management system of the aircraft converting, when one of the initial and secondary flight plans is activated, said flight plan into a trajectory, and one action at least from among sending instructions to follow the trajectory to an autopilot and displaying the trajectory to the aircraft operator.

Another subject of the invention is a computer program comprising program code instructions recorded on a computer-readable medium, said program code instructions being configured, when said program runs on a computer, to execute a method according to the one of the embodiments of the invention.

Another subject of the invention is a flight management system for an aircraft, comprising computing means configured to execute a method according to one of the embodiments of the invention.

BRIEF DESCRIPTION OF THE DRAWINGS

Other features, details and advantages of the invention will become apparent upon reading the description given with reference to the appended drawings, which are given by way of example and in which, respectively.

DETAILED DESCRIPTION

Some acronyms commonly used in the technical field of the present application may be used in the description. These acronyms are listed in the table below, notably with their English expression and their meaning.

| Acronym | Expression | Meaning |
|---|---|---|
| DF | Direct to Fix | Direct to fix. Type of navigation segment, comprising a join to the next waypoint with a gradual change in the heading of the aircraft from the initial heading. |
| FAF | Final Approach Fix | Final approach fix. Designates a waypoint in a navigation database defined for an airport instrument approach. This is the starting point for the final segment of the approach. |
| FPLN | Flight Plan | Flight plan. Description of the flight followed by the aircraft, and notably the waypoints describing the route thereof. |
| FMD | Flight Management Display | Display, in a cockpit, of Flight Management data in the form of pages or windows. System for displaying data supplied by an FMS system. |
| FMS | Flight Management System | Flight Management System. Computerized system for computing trajectories and flight plans for aircraft, and for supplying guidance instructions adapted to the operator or autopilot to follow the computed trajectory. |
| IF | Intermediate Fix | Intermediate approach fix. Designates a waypoint in a navigation database defined for an airport instrument approach. This is an intermediate point of an approach to the airport, separating the initial segment from the intermediate segment of the approach. |
| KCCU | Keyboard Console Control Unit | Keyboard Cursor Control Unit. Human-Machine Interface able to be integrated into a cockpit, comprising a keyboard so that the operator is able to enter information into the FMS. |
| MAP or MAPT | Missed Approach PoinT | Missed Approach Point. Designates a waypoint defined for an airport in a navigation database. It corresponds to the point from which, if a visual reference (for example a runway) is not visible to the operator, said operator has to perform a missed approach procedure. |
| MCDU | Multi-purpose Control Display Unit | Multifunction Display Unit. Human-Machine Interface able to be integrated into a cockpit, allowing the display and entry of numerous information related to the FMS. |
| ND | Navigation Display | Navigation Screen. Cockpit display element showing in particular the lateral flight trajectory. |
| VD | Vertical Display | Vertical Display. Display element able to be integrated into a cockpit, and displaying the reference profile and the vertical joining profile of the aircraft. |
| WPT | WayPoinT | Waypoint. In air navigation, designates a point on the route to be reached where a change of heading has to take place. |

Figure 1:
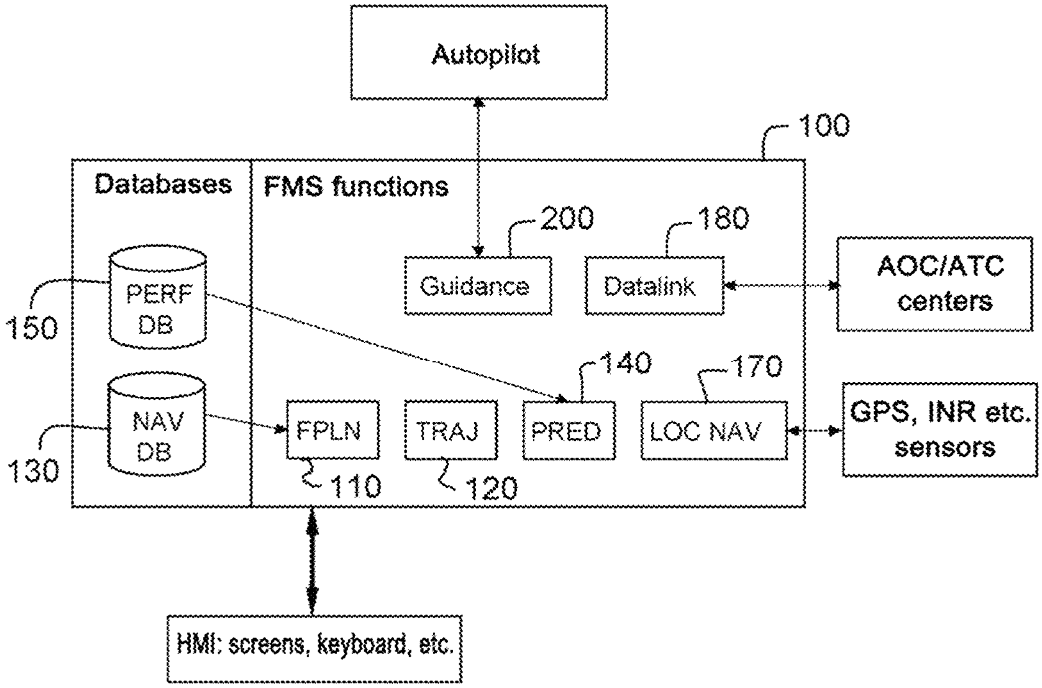
FIG. 1 shows an FMS system in which the invention may be implemented.

FIG. 1 shows an FMS system in which the invention may be implemented.

A flight management system may be implemented by at least one computer on board an aircraft or on board a ground station. According to various embodiments of the invention, it may be a flight management system for various types of aircraft, for example an airplane, a helicopter or a drone. The FMS 100 determines notably a geometry of a flight plan profile followed by the aircraft. The trajectory is computed in four dimensions: three spatial dimensions and a time/speed profile dimension. The FMS 100 also transmits, to the operator, via a first operator interface, or to the autopilot, guidance instructions computed by the FMS 100 to follow the flight profile. The operator may be located in the aircraft, for example if the aircraft is an airplane or a helicopter, or else on the ground, for example if the aircraft is a drone.

A flight management system may comprise one or more databases such as the database PERF DB 150, and the database NAV DB 130. For example, the database PERF DB 150 may contain aerodynamic parameters of the aircraft, or else features of the engines of the aircraft. It contains notably the performance margins applied systematically in the prior art to guarantee safety margins on the descent and approach phases. The database NAV DB 130 may for example contain the following elements: geographical points, beacons, air routes, departure procedures, arrival procedures, altitude constraints, speed constraints or slope constraints.

The management of a flight plan according to the prior art may invoke means allowing the aircraft flight crew to create/modify a flight plan through one or more human-machine interfaces, for example:

the MCDU;

the KCCU;

the FMD;

the ND;

the VD.

This flight plan creation/modification may for example comprise the loading of procedures by the operator, along with the selection of a procedure to be added to the current flight plan.

The FMS 100 comprises a flight plan management module 110, usually called FPLN. The module FPLN 110 notably makes it possible to manage various geographical elements forming a skeleton of a route to be followed by the aircraft comprising: a departure airport, waypoints, air routes to be followed, an arrival airport. The module FPLN 110 also makes it possible to manage various procedures forming part of a flight plan such as: a departure procedure, an arrival procedure. The FPLN 110 capability makes it possible notably to create, modify and delete a primary or secondary flight plan.

The flight plan and its various information related notably to the corresponding trajectory computed by the FMS may be displayed for consultation by the flight crew using display devices, also called human-machine interfaces, which are present in the cockpit of the aircraft, such as an FMD, an ND, a VD.

The module FPLN 110 uses data stored in databases PERF DB 150 to construct a flight plan and the associated trajectory.

The FMS 100 also comprises a module TRAJ 120 for computing a lateral trajectory for the flight plan defined by the module FPLN 110. The module TRAJ 120 notably constructs a continuous trajectory from points of an initial flight plan while at the same time complying with the performance of the aircraft as supplied by the database PERF DB 150. The initial flight plan may be an active flight plan or a secondary flight plan. The continuous trajectory may be presented to the operator by way of one of the human-machine interfaces.

The FMS 100 also comprises a trajectory prediction module PRED 140. The module PRED 140 notably constructs an optimized vertical profile from the lateral trajectory of the aircraft as supplied by the module TRAJ 120. To this end, the module PRED 140 uses the data from the first database PERF DB 150. The vertical profile may be presented to the operator by way of a VD, for example.

The FMS 100 also comprises a localization module 170, called LOCNAV in FIG. 1. The module LOCNAV 170 notably performs optimized geographical localization, in real time, of the aircraft on the basis of geolocation means on board the aircraft.

The FMS 100 also comprises a data link module 180, called DATA LINK in FIG. 1. The module DATA LINK 180 makes it possible to communicate with operators on the ground, for example in order to transmit a predicted trajectory of the aircraft, or to receive constraints on the trajectory, such as the predicted position of other aircraft or altitude constraints.

The FMS 100 also comprises a guidance module 200. The guidance module 200 notably supplies, to the autopilot or to one of the human-machine interfaces, appropriate commands for guiding the aircraft in lateral and vertical geographical planes (altitude and speed) so that said aircraft follows the trajectory planned in the flight plan.

Figure 2:
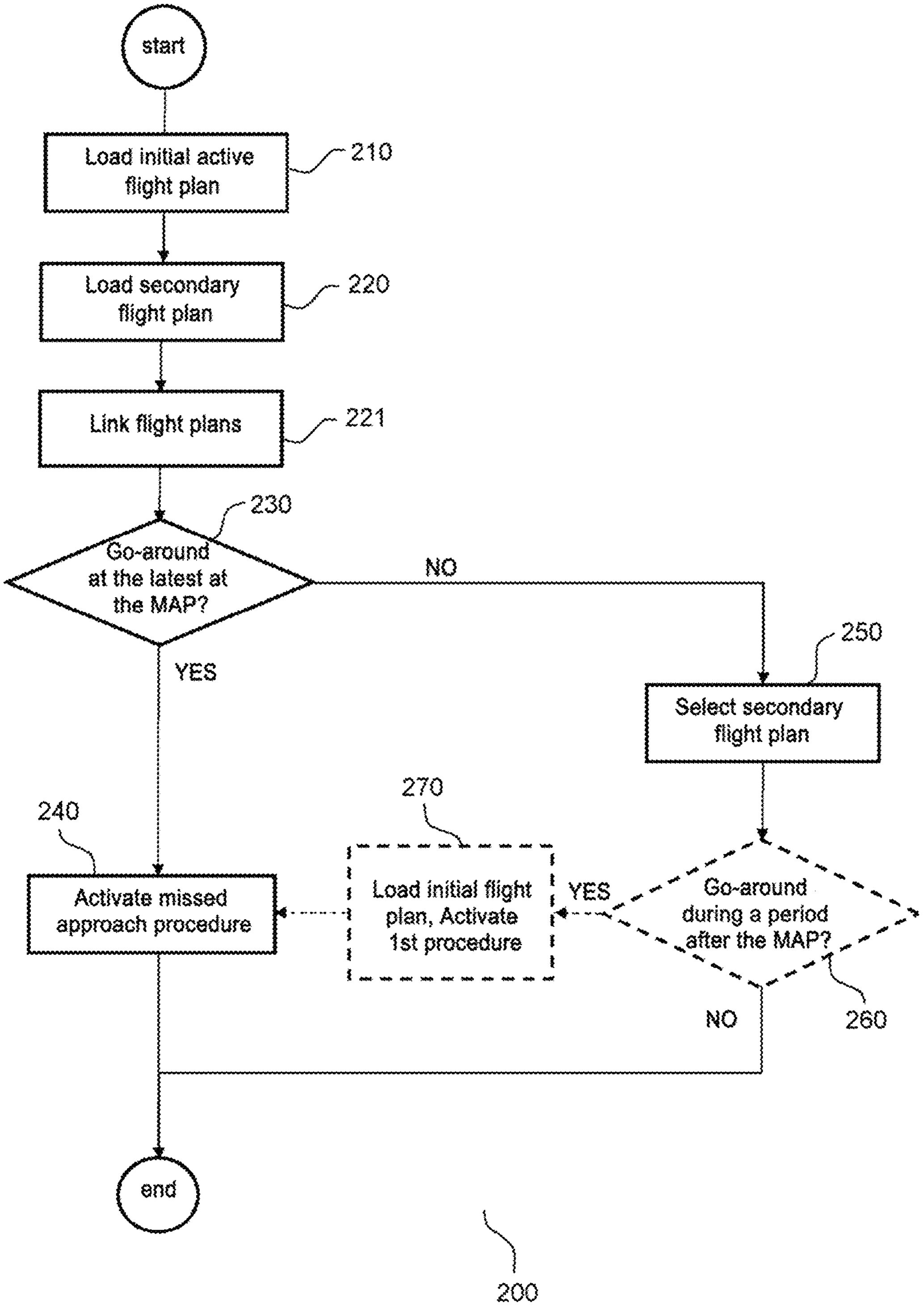
FIG. 2 shows one example of a method in one set of embodiments of the invention.

FIG. 2 shows one example of a method in one set of embodiments of the invention.

Figure 3:
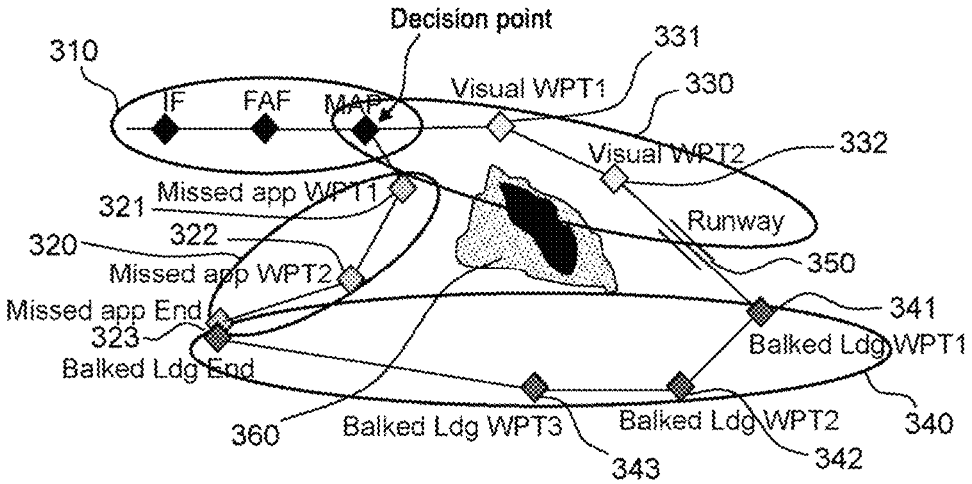
FIG. 3 shows one example of an approach to an airport according to one set of modes of implementation of the invention.

In order to make the present description easier to read, FIG. 2 will be commented upon with reference to FIG. 3, showing one example of an approach to an airport according to one set of modes of implementation of the invention. Of course, FIG. 3 is provided by way of non-limiting example only of an airport approach to which the invention may be applied.

In FIG. 3, each waypoint is represented by a diamond, accompanied by a description of the name associated with the waypoint. Although some names are expressed in English, the names are a name given to each waypoint, for example by the operator, the airline or air traffic controllers.

The names may be understood as follows:

Missed app WPT1: missed approach point 1;

Missed app WPT2: missed approach point 2;

Missed app end: missed approach end;

Visual WPT1: visual point 1;

Visual WPT2: visual point 2;

Runway: landing runway;

Balked Ldg WPT 1: balked landing point 1;

Balked Ldg WPT 2: balked landing point 2;

Balked Ldg WPT 3: balked landing point 3;

Balked Ldg End: balked landing end.

The method 200 is a computer-implemented method. It may for example be implemented by the FMS 100.

The method 200 comprises a first step 210 of loading an initial active flight plan.

Generally speaking, the method 200 relates to the definition of a flight plan for an aircraft. More specifically, it relates to the definition of the horizontal flight plan, or route, for the aircraft.

The initial active flight plan is a flight plan for approaching an airport. It thus comprises a first approach procedure 310 to a runway 350. The first approach procedure 310 comprises waypoints up to a missed approach point MAP. In the example of FIG. 3, the first approach procedure 310 comprises 3 successive waypoints:

An intermediate approach fix IF;

A final approach fix FAF;

The missed approach point MAP.

The initial flight plan also comprises a missed approach procedure 320. In the example of FIG. 3, the missed approach procedure aims to allow the aircraft, if the runway 331 is not visible at the MAP, or more generally if the conditions for landing are not met, to perform a go-around maneuver in order to get to safety and to decide on the next action to be performed (for example, a new approach attempt). Missed approach procedures are officially published and defined by the navigation authorities for each airport, depending on the environment thereof. In the example of FIG. 3, the missed approach procedure aims to divert the aircraft while at the same time avoiding a mountain 360, and comprises 3 waypoints 321, 322 and 323, point 323 forming the final point of the missed approach procedure.

The missed approach procedure 320 may thus comprise a sequence of maneuvers between the point MAP and the final point 323, in order to allow the aircraft to regain altitude on a go-around activated by the operator.

In the prior art, an operator, when approaching an airport, has available only the first approach procedure 310 and the missed approach procedure 320. Said operator may therefore activate the missed approach procedure 320 when he realizes, at the latest at the missed approach point MAP, that the conditions for a successful landing are not met. At the end of said missed approach procedure, the aircraft will have regained altitude and will be safely at the final point 323 of the missed approach procedure.

However, if the operator considers that landing in satisfactory conditions is not possible after having passed the missed approach point MAP, he does not immediately have available, in the prior art, an appropriate procedure allowing him to bring the aircraft to safety. The operator therefore has to identify, by himself and in real time, the best lateral and upward trajectory, in conjunction with air traffic control. Such a flight phase is very difficult for an operator to grasp and he has to quickly decide on the best course of action in a complex environment, generally comprising, in the immediate vicinity of an airport, dense traffic and nearby terrain.

Late go-around procedures may be defined or published by airlines. For a given airport, this late go-around procedure makes it possible to keep the aircraft safe if a landing is not possible when the aircraft has passed the missed approach point MAP. However, these procedures are at present not completely satisfactory. Indeed, such procedures, when they exist, at present have to be performed manually. The operator then, in the complex environment outlined above (dense traffic, proximity of the terrain, interaction with air traffic control, etc.), has to manually decipher and carry out a procedure of safely extracting the aircraft. Such a situation may prove to be extremely complex to manage and stressful for an operator, or even, in the most critical cases, compromise the safety of the aircraft.

In order to rectify this problem, the method 200 according to the invention also comprises a second step 220 of automatically selecting a secondary flight plan. This secondary flight plan comprises its own approach procedure 330 (which may also be called second approach procedure 330 in this application) between the missed approach point MAP and a runway 350 of the airport, said second approach procedure possibly being a visual approach procedure. In the example of FIG. 3, this visual approach 330 comprises the waypoints 331, 332, and then a point located on the runway 350. The second approach procedure follows the first approach procedure, that is to say that it starts at the end of the first one.

The secondary flight plan also comprises its own missed approach procedure 340 (which may also be called second missed approach procedure 340 in this application) at the end of the visual approach 330, possibly comprising a go-around. This second missed approach procedure 340 ends at an end point that may or may not belong to the missed approach procedure 323. In the example of FIG. 3, the second missed approach procedure 340 comprises 4 waypoints: the points 341, 342, 343 and then the final point 323. Although, in FIG. 3, the missed approach procedure 320 and the missed approach procedure 340 of the secondary flight plan end at the same final point 323, the invention is not limited to this example and, according to other modes of implementation of the invention, the missed approach procedure 340 of the secondary flight plan ends at a point of the missed approach procedure. Connecting the missed approach procedure 340 of the secondary flight plan to the initial missed approach procedure allows the operator, when the aircraft is following the second missed approach procedure 340, to position the aircraft at a point known to air traffic control. According to other embodiments of the invention, the second missed approach procedure 340 ends at a second final point, which does not belong to the first missed approach procedure 320.

This secondary flight plan allows the operator to execute a second approach attempt with a view to landing and also to have available a flight plan allowing the aircraft to regain altitude in complete safety, if he cannot land when he has passed the missed approach point MAP by a significant margin. Indeed, it is generally possible for the aircraft to approach the runway even if it cannot land there. In addition, the end of the flight plan at the final point 323 will allow the aircraft to be in a known situation: when the secondary flight plan is followed, the aircraft is located at the end thereof at the same point as if it had followed the missed approach procedure 320. The aircraft is therefore then located at a point identified as being that from which it is able to restart a new approach attempt, thereby simplifying the activities of the operator without impacting the air traffic controllers.

Finally, the operator may follow the procedure defined initially in the secondary flight plan to the runway 350 and land, if the conditions for a safe landing are met. If not, the operator has available a procedure ready for a go-around and to regain aircraft altitude.

The method 200 then comprises a step 221 of receiving an instruction from the operator to link the initial active flight plan and the secondary flight plan.

This step consists in receiving an indication from the operator that the two initial active and secondary flight plans should be linked, that is to say that each of the two flight plans may, as will be explained below, be selected automatically on the basis of the evolution of the trajectory of the aircraft. This step of linking the initial active flight plan and a secondary flight plan therefore consists of an association between the two flight plans, allowing automatic selection of one or the other when certain conditions are met. This step makes it possible to ensure that the operator explicitly validates the link between the two flight plans.

This step may be carried out in various ways. For example, the two flight plans may be displayed simultaneously to the operator, who has a button available to link the two flight plans.

In addition, in one set of embodiments of the invention, the flight plans may be linked or unlinked at any time, that is to say that the operator may remove the link between the initial active flight plan and the secondary flight plan, or replace the secondary flight plan with a new secondary flight plan, which will or will not be linked to the initial active flight plan.

Finally, it should be noted, as will be explained in more detail in the remainder of this application, that the secondary flight plan depends on the initial active flight plan: by default, the flight plan that is followed is the initial active flight plan, and, if certain conditions are met while following the initial active flight plan and the link between the two flight plans is active, each of the two flight plans may be selected automatically.

The method 200 comprises a step 230 of detecting a possible go-around by the operator at the latest at the missed approach point MAP.

In the event of a go-around at the missed approach point MAP, or earlier, the method 200 comprises a step 240 of automatically activating the missed approach procedure 320.

If not, that is to say if the aircraft passes the missed approach point MAP without a go-around, the method 200 comprises a step 250 of automatically selecting the secondary flight plan as active flight plan. With the old active flight plan becoming the secondary flight plan, it is said that there is automatic selection of the flight plans. The flight plan that is displayed as active flight plan is the flight plan comprising the procedures 330 and 340.

The method 200 has many advantages. First of all, the operator always has available a flight plan to follow. This allows the operator to ensure the safety of the aircraft in all circumstances.

In addition, steps 230, 240 and 250 make it possible to automatically select the most appropriate procedure according to the actions of the operator. It will thus be sufficient for the operator, if he realizes at the latest at the MAP that landing is not possible in good conditions, to trigger a go-around in order to activate the missed approach procedure 320, and, if not, to follow the final approach segment of the secondary flight plan, selected automatically as a replacement for the active flight plan, which leads him to the runway, while at the same time guaranteeing, if necessary, the existence of a route for safeguarding the aircraft if landing is again not possible. The operator may thus link the initial active and secondary flight plans in step 221 prior to landing, and then the flight plans are selected automatically without operator action during the landing.

This makes it possible to considerably simplify the work of the operator, who will not have to manually select or define a procedure in a complex environment if landing is not possible when the aircraft has passed the missed approach point MAP. This makes it possible to increase the safety of the aircraft.

In one set of embodiments of the invention, the method 200 comprises, when no go-around has taken place at the latest at the missed approach point MAP, and when the secondary flight plan is selected automatically in step 250, a step 260 of detecting a possible go-around by the operator during a predetermined period after passing the missed approach point MAP.

When a go-around takes place during this predetermined period, the initial flight plan is automatically reselected as active flight plan, and the missed approach procedure 320 is activated in step 240. The link between the two flight plans thus remains active during the predetermined period.

This makes is possible to give the operator a time period to initiate the go-around and activate the initial missed approach procedure 320. Indeed, the selection of the secondary flight plan in step 250 generally modifies the ND: the operator is thus informed that the missed approach point MAP has been passed, and that the secondary flight plan has just automatically replaced the initial flight plan. If this does not correspond to the operator's needs, and he has to use the missed approach procedure 320, the operator therefore benefits from a time period to initiate the go-around, and thus to automatically reselect the initial active flight plan and activate the missed approach procedure 320. In this case too, the actions of the operator are simplified, because the most suitable flight plan is selected automatically based on the actions of the operator.

The time period within which this automatic selection is possible may be predetermined based on multiple criteria, notably the reaction time of the operator (in order to give the operator time to initiate the go-around after having identified the automatic first selection of the flight plans). Activating this procedure after passing the MAP may bring about a change of heading that is all the more abrupt when the activation of the procedure is delayed. Indeed, a missed approach procedure is generally characterized by a significant change in the heading of the aircraft. The possible activation time period for the procedure after passing the MAP should therefore be limited. Generally speaking, a predefined time period of a few seconds is suitable. For example, a time period of 2 seconds generally provides good results.

In the embodiments in which automatic flight plan selection is possible during a predetermined period in step 270, various guidance modes are possible during this predetermined period.

A first guidance mode consists in keeping the guidance instruction active in the initial flight plan during the predetermined period after passing the MAP.

In practice, the aircraft will therefore follow the heading corresponding to the approach procedure during the predetermined period, and then, if no go-around takes place during this period, changes heading to follow the approach procedure 330. This solution has the advantage of being easy to implement. However, it may also involve a high degree of roll at the end of the predetermined period, when the operator does not decide to activate the go-around, and the aircraft has to capture the new active segment of the procedure 330.

A second guidance solution consists, for the aircraft, in following, from the MAP, the new active flight plan (and therefore the approach procedure 330), while at the same time limiting roll rate during the predetermined period. For example, the roll rate may be limited to a predefined rate, allowing both the aircraft to gradually settle on the approach procedure 330, and making it possible, if the operator triggers a go-around during the predetermined period, to limit the roll of the aircraft to join the missed approach procedure 320.

This solution therefore makes it possible to limit the roll of the aircraft regardless of the route ultimately followed by the operator. It also allows the operator to be informed of the change of heading of the aircraft when the secondary flight plan is selected automatically.

A third solution consists, when the secondary flight plan is selected automatically, in inserting a DF segment to the first waypoint of the visual approach procedure.

This solution has the advantage of depicting a gradual and visible transition on the ND, from the current heading of the aircraft at the MAP, between the heading according to the initial active flight plan, and the heading necessary to join the first waypoint of the secondary flight plan that has just automatically replaced the initial flight plan as active flight plan.

The invention thus makes it possible to link the initial flight plan and the secondary flight plan, and to keep this link during a predetermined period after passing the MAP. The operator may then choose to select one or the other of the flight plans, by way of a go-around during the predetermined period, while at the same time maintaining guidance of the aircraft regardless of his decision. This therefore allows the operator to have available an extremely intuitive solution to obtain the best flight plan.

According to various embodiments of the invention, the secondary flight plan may be obtained in various ways.

For example, the secondary flight plan may be a pre-existing flight plan, for example established by the airline for a given airport.

In one set of embodiments of the invention, the secondary flight plan is established by the operator during the flight.

For example, the operator may establish the flight plan in a relatively non-stressful flight phase, such as the cruising phase.

This may be carried out in various ways.

For example, the operator may manually define the secondary flight plan.

The operator may also select the secondary flight plan from among multiple candidates generated by the flight management system and corresponding to the expected criteria. For example, the secondary flight plan may be generated and selected as follows:

- the operator sends, to a flight management system of the aircraft, a request to automatically obtain a secondary flight plan;
- the flight management system generates a plurality of candidate secondary flight plans:
  - starting at the missed approach point;
  - passing through the runway;
  - ending at a given final point, which may or may not be a point of the first missed approach procedure 320;
- the operator selects the secondary flight plan from among said candidate secondary flight plans.

The secondary flight plan thus selected is then loaded in step 220. The linking step 221 may then be performed automatically or manually between the initial active flight plan and the selected secondary flight plan.

In one set of embodiments of the invention, the flight management system generates all possible flight plans meeting the above criteria.

When a flight plan is activated, or a procedure is selected, the FMS may process them in order to convert them into a trajectory, for example via the module TRAJ 120, and send the appropriate instructions to an autopilot and/or display the trajectory to the aircraft operator, in order to follow the trajectory.

Figure 4:
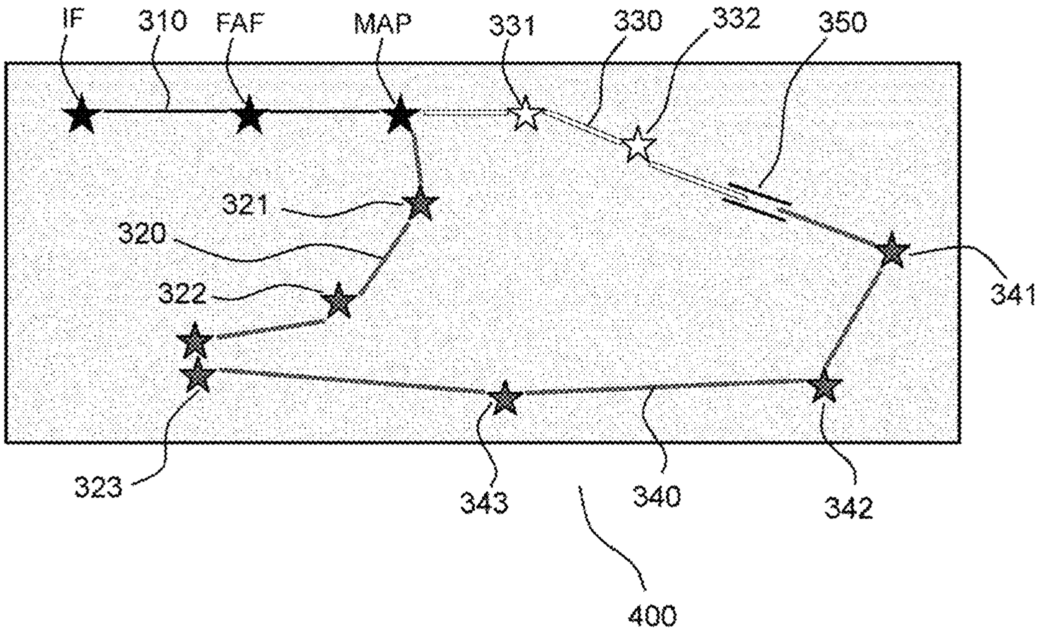
FIG. 4 shows one example of a depiction of a flight plan and procedures according to one set of modes of implementation of the invention.

FIG. 4 shows one example of a depiction of a flight plan and procedures according to one set of modes of implementation of the invention.

The depiction 400 may for example be presented to the operator on an ND (Navigation Display or horizontal display).

The example in FIG. 4 corresponds to the situation presented in FIG. 3. Of course, the invention is in no way limited to the situation shown in FIG. 3, nor to the representation in FIG. 4.

The depiction 400 comprises all of the elements of the waypoints, flight plans and procedures shown in FIG. 3.

When a procedure is activated, or a flight plan is selected, the depiction of the corresponding elements is highlighted on the depiction 400. For example, the secondary flight plan may be highlighted when it is selected. This allows the operator to obtain a visual indication of the procedure or of the flight plan that will be followed by the aircraft.

The depiction 400 may also comprise interface elements, for example buttons, allowing the operator to link and if necessary to unlink flight plans. The operator is thus able to view the initial and secondary flight plans, and link them and/or unlink them when this seems appropriate to him.

Figure 5:
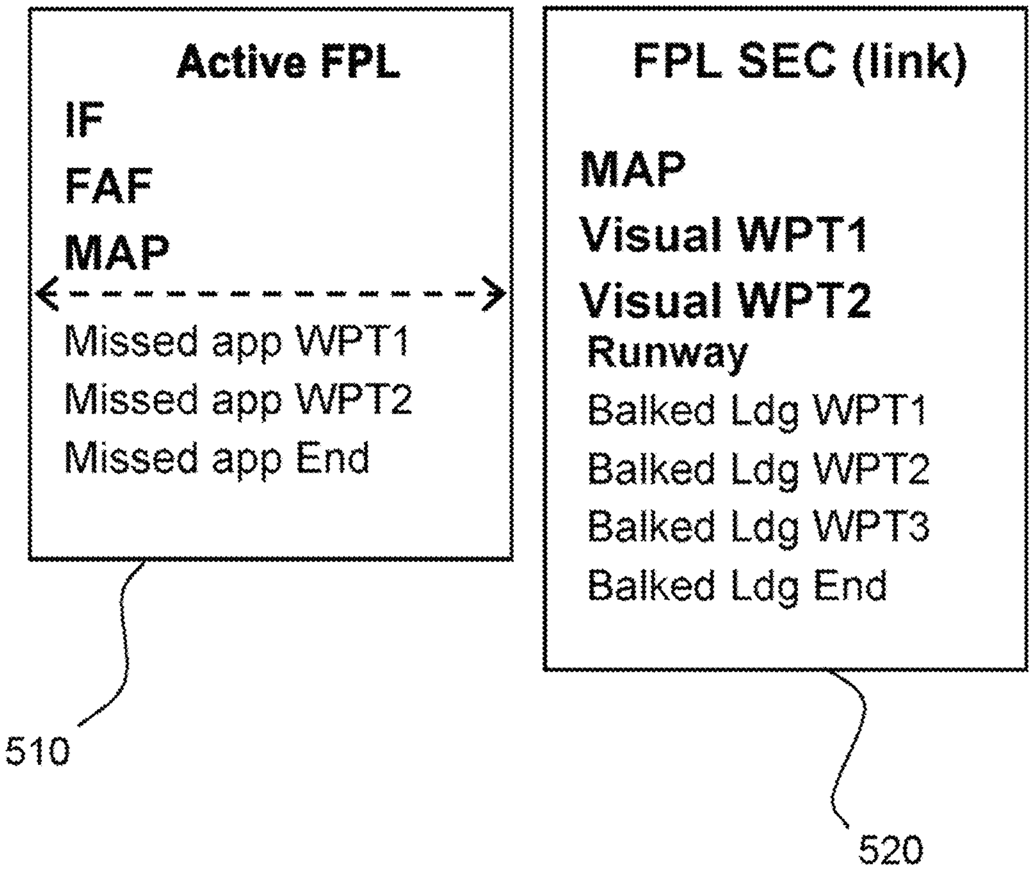
FIG. 5 shows a display of waypoints to the operator in one set of embodiments of the invention.

FIG. 5 shows a display of waypoints to the operator in one set of embodiments of the invention.

This display may be made to the operator, for example on the MFD.

It comprises displaying waypoints of the active flight plan 510, and displaying waypoints of the secondary flight plan 520.

FIG. 5 thus shows the initial display of the waypoints to the operator, when the aircraft has not yet passed the MAP.

Figure 6:
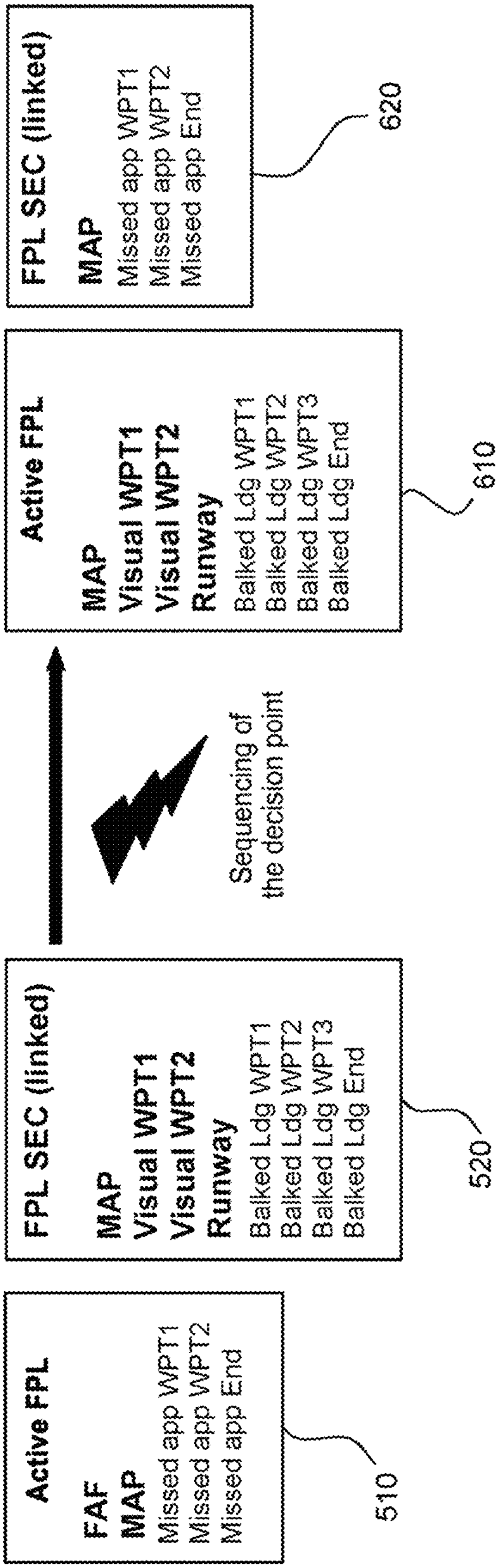
FIG. 6 shows a modification of the display of waypoints to the operator in one set of embodiments of the invention.

FIG. 6 shows a modification of the display of waypoints to the operator in one set of embodiments of the invention.

Initially, the display is identical to that shown in FIG. 5.

When the aircraft passes the MAP, if the operator has not performed a go-around, the secondary flight plan is selected automatically in step 250, and the secondary flight plan therefore replaces the active flight plan.

It is then shown 610 as active flight plan, and the points not yet flown over in the initial active flight plan are shown 620 as secondary flight plan.

In FIG. 5, like FIG. 6, the waypoints not indicated in bold correspond to the points belonging to a missed procedure.

The above examples demonstrate the ability of the invention to define the most suitable flight plan for an aircraft in an approach phase of an aircraft, making it possible to offer, at all times, a trajectory that brings the aircraft to safety, intuitively for the operator. However, they are only given by way of example and in no way limit the scope of the invention as defined in the claims below.

The invention claimed is:

1. A method implemented in a Flight Management system (FMS) of an aircraft, the FMS comprising one or more databases, wherein said method comprising: loading an initial active flight plan for an aircraft comprising a first approach procedure to a runway up to a missed approach point (MAP), and a missed approach procedure between said missed approach point (MAP) and a final point; loading a secondary flight plan comprising a second approach procedure to the runway and a second missed approach procedure, said second approach procedure being between the missed approach point (MAP) and the runway and following the first approach procedure, and said second missed approach procedure starting at an end of said second approach procedure and ending at a second final point; receiving an instruction from an operator of the aircraft to link the initial active flight plan and the secondary flight plan, said link consisting of an association between the active flight plan and the secondary flight plan, allowing automatic selection of one or the other; automatically selecting the secondary flight plan as active flight plan when no go-around maneuver takes place at or before the missed approach point and when a go-around is triggered by the operator at a latest at said missed approach point, activating said missed approach procedure of the initial active flight plan; and wherein the method comprises converting, by the FMS, the activated approach procedure or the active flight plan into a trajectory to be followed by the aircraft.

2. The method as claimed in claim 1, comprising, if a go-around occurs during a predetermined period after passing the missed approach point, automatically selecting the initial flight plan as current flight plan, and activating said missed approach procedure.

3. The method as claimed in claim 2, wherein the method comprises transmitting a guidance instruction for guiding the aircraft to follow a flight plan, and wherein in response to the automatic selection of the secondary flight plan as active flight plan, the guidance instruction to follow said active flight plan is maintained active during said predetermined period.

4. The method as claimed in claim 2, wherein the aircraft having a roll rate, and wherein the roll rate of the aircraft is limited to a predefined roll rate during said predetermined period.

5. The method as claimed in claim 2, comprising, when the secondary flight plan is selected as active flight plan, inserting a segment having a navigation segment type Direct to Fix (DF) to a first waypoint of the second approach procedure.

6. The method as claimed in claim 2, comprising, if a go-around occurs after said predetermined period after passing the missed approach point (MAP), activating the second missed approach procedure.

7. The method as claimed in claim 1, wherein the secondary flight plan is established manually by the aircraft operator during a flight phase.

8. The method as claimed in claim 1, wherein the aircraft operator sends, to the flight management system of the aircraft, a request to automatically obtain the secondary flight plan, and wherein:

the flight management system generates a plurality of candidate secondary flight plans:

starting at the missed approach point (MAP); and passing through the runway; and ending at said second final point; and the operator selects said secondary flight plan from among said candidate secondary flight plans.

9. The method as claimed in claim 1, comprising the flight management system of the aircraft converting, when one of the initial flight plan and the secondary flight plan is activated, said flight plan into a trajectory, and one action at least from among sending one or more guidance instructions to follow said trajectory to an autopilot and displaying the trajectory to the aircraft operator.

10. A computer program comprising program code instructions recorded on a non-transitory computer-readable medium, said program code instructions being configured, when said computer program runs on a computer, to execute the method as claimed in claim 1.

11. A flight management system for an aircraft, comprising computing means configured to execute the method as claimed in claim 1.

* * * * *